A. A. REMINGTON.
MEANS OF SPRING SUPPORTING VEHICLE FRAMES FROM THEIR AXLES.
APPLICATION FILED NOV. 21, 1914.

1,149,084.

Patented Aug. 3, 1915.

Witnesses
Marie Mattingly
Harry King

Inventor
Alfred Arnold Remington.
By Frank Chase Somes
Attorney.

UNITED STATES PATENT OFFICE.

ALFRED ARNOLD REMINGTON, OF BIRMINGHAM, ENGLAND.

MEANS OF SPRING-SUPPORTING VEHICLE-FRAMES FROM THEIR AXLES.

1,149,084. Specification of Letters Patent. Patented Aug. 3, 1915.

Application filed November 21, 1914. Serial No. 873,279.

*To all whom it may concern:*

Be it known that I, ALFRED ARNOLD REMINGTON, a subject of the King of Great Britain, and residing at Birmingham, in the county of Warwick, England, engineer, have invented certain new and useful Improvements in Means of Spring-Supporting Vehicle-Frames from Their Axles, of which the following is a specification.

This invention relates to an improvement in or modification of the invention described and claimed in the specification of an invention for which I have applied for Letters Patent of the United States under Serial Number 709,411.

According to the present invention, a transverse bar is carried in bearings of the vehicle frame, and cantaliver springs, in positions, as seen in plan view, outside the sides of the frame, respectively, are each fixed at one end to such bar and at its other end each is connected with the corresponding axle; and the tendency of the transverse bar to turn in its bearings, due to the tendency of these springs to yield under vertical movements of the body in relation to the axle when the vehicle is running in a straight course, is elastically resisted by separate means which connect the transverse bar with the said frame, and are arranged, as seen in plan view, between the sides of the frame. The cantaliver springs do not extend substantially beyond the transverse bar at the side thereof which is the more remote from the corresponding axle; and consequently a clearer space is left at the outside of the frame, between the front and back wheels, than if the springs were of the kind described in the said prior specification.

A practical application of the invention is shown by the drawings herewith, of which:—

Figure 1:
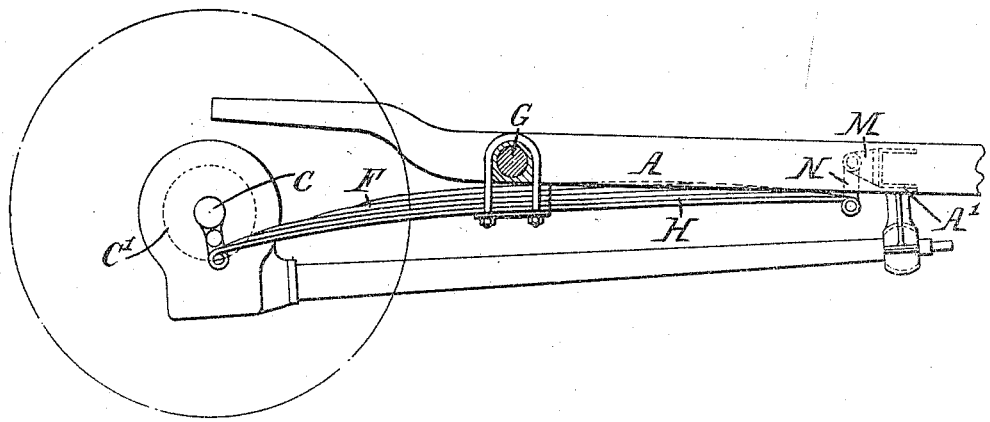
Figure 2:
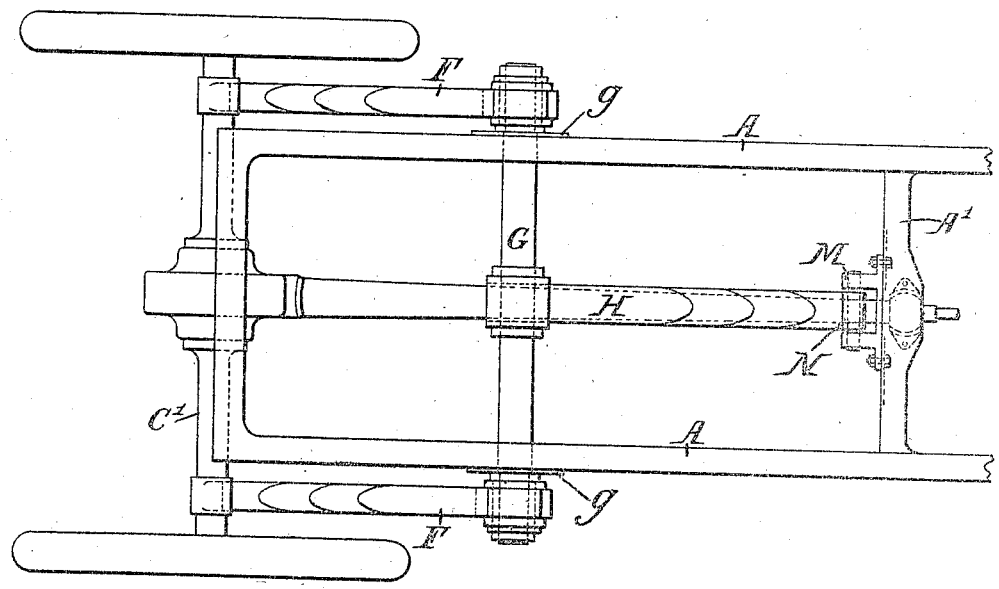

Figure 1 is a side elevation and Fig. 2 a plan view.

G is a transverse bar which is carried in bearings *g* of the sides A of the vehicle frame, and projects at each end beyond the sides of such frame.

F F are cantaliver springs of the laminated plate type, which are fixed at their inner ends to the opposite ends, respectively, of the bar G, and are connected at their other ends with the axle case C'.

A spring arm H is fixed at one end to the bar G in position, as seen in plan view, between the sides of the frame, and at its other end is connected with a bracket M of a transverse member A' of the frame, through the medium of a link N.

Having fully described my invention, what I claim and desire to secure by Letters Patent, is:—

1. For spring supporting a vehicle frame from an axle thereof, bearings of said frame, a transverse bar which is carried in said bearings and projects at each end beyond the sides of said frame, cantaliver springs fixed at their ends in one direction to the projecting ends respectively, of said bar and connected at their other ends with said axle, and elastic means arranged between the sides of said frame and connecting said bar and said frame.

2. For spring supporting a vehicle frame from an axle thereof, bearings of said frame, a transverse bar which is carried in said bearings and projects at each end beyond the sides of said frame, cantaliver springs fixed at their ends in one direction to the projecting ends respectively of said bar and connected at their other ends with said axle, and a spring arm disposed between the sides of said frame and having one end fixed to said bar and the other end connected with a transverse member of said frame.

In witness whereof I have hereunto signed my name this 6th day of November, 1914, in the presence of two subscribing witnesses.

ALFRED ARNOLD REMINGTON.

Witnesses:
ERNEST HARKER,
ROBERT G. GROVES.